United States Patent
Wittig et al.

(10) Patent No.: US 7,004,200 B1
(45) Date of Patent: Feb. 28, 2006

(54) CONSTANT FLOW VALVE FOR A WATER SOFTENER CONTROL ASSEMBLY

(75) Inventors: Mark J. Wittig, Franklin, WI (US); Kenneth J. Sieth, Delafield, WI (US); John D. Stolz, Grafton, WI (US); Jeffrey G. Franks, Menomonee Falls, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/040,935

(22) Filed: Jan. 21, 2005

(51) Int. Cl.
*F16K 15/04* (2006.01)
(52) U.S. Cl. .......................... 138/45; 138/46; 137/843
(58) Field of Classification Search ................ 138/45, 138/46; 137/877, 879, 843, 533.11
See application file for complete search history.

(56) References Cited

U.S. PATENT DOCUMENTS

| | | | | |
|---|---|---|---|---|
| 851,999 A * | 4/1907 | Skellenger | .................... | 138/46 |
| 879,472 A * | 2/1908 | Keller | .......................... | 138/46 |
| 1,788,358 A * | 1/1931 | Goerg | ..................... | 137/513.7 |
| 2,576,687 A * | 11/1951 | Krehbiel | ...................... | 73/714 |
| 3,367,362 A * | 2/1968 | Hoffman | ..................... | 137/517 |
| 3,498,315 A * | 3/1970 | Hester et al. | ................ | 137/375 |
| 3,874,412 A | 4/1975 | Fleckenstein et al. | .. | 137/624.13 |
| 4,075,294 A * | 2/1978 | Saito et al. | ................. | 261/34.2 |
| 4,100,940 A * | 7/1978 | Spears | ......................... | 137/877 |
| 4,200,119 A * | 4/1980 | Cunningham | ............... | 137/605 |
| 4,258,801 A * | 3/1981 | Poston | ......................... | 175/65 |
| 4,674,529 A * | 6/1987 | Ferguson | .................... | 137/375 |
| 5,250,187 A | 10/1993 | Franks | ........................ | 210/661 |
| 5,762,093 A * | 6/1998 | Whitley, II | .................. | 137/199 |
| 5,910,244 A | 6/1999 | Stamos et al. | .............. | 210/138 |

* cited by examiner

*Primary Examiner*—Patrick Brinson
(74) *Attorney, Agent, or Firm*—George E. Haas; Quarles & Brady LLP

(57) ABSTRACT

A flow control valve controls a flow of water through a passage to a brine tank of a water treatment apparatus. A valve seat is between first and second sections of the passage. The valve seat has a first end with a concave surface facing the first section and an aperture extending from the concave surface to a second end that faces the second section. A groove in the concave surface extends from the first end to the aperture. A valve element moves within the first section in response to pressure of the water in the first section thereby varying the size of a path through the passage by an amount that varies as a function of the water pressure. The action of the valve element maintains a substantially constant flow rate through the flow control valve regardless of water pressure variation.

20 Claims, 2 Drawing Sheets

CONSTANT FLOW VALVE FOR A WATER SOFTENER CONTROL ASSEMBLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to apparatus for softening water; and more particularly to control valves for regenerating the resin bed of the water softening apparatus.

It is quite common for water drawn from a well to be considered "hard" in that it contains di-positive and sometimes tri-positive ions which have leached from mineral deposits in the earth. Such ions form insoluble salts with common detergents and soaps producing precipitates that increase the quantity of detergent or soap required for cleaning purposes. When hard water is used in boilers, evaporation results in the precipitation of insoluble residues that tend to accumulate as scale.

It is standard practice to install a water softener in the plumbing system of a building that is supplied with hard water. The most common kind of water softener is an ion exchange apparatus that has a tank which holds a bed of resin through which the hard water flows to remove undesirable minerals and other impurities. Binding sites in the resin bed initially contain positive ions, commonly uniposi- tive sodium or potassium ions. As hard water enters the resin, competition for the binding sites occurs. The di- positive and tri-positive ions in the hard water are favored due to their higher charge densities and displace the uni- positive ions. Two or three unipositive ions are displaced for each di-positive or tri-positive ion, respectively.

The capacity of the rein bed to absorb minerals and impurities is finite and eventually ceases to soften the water when a large percentage of the sites become occupied by the di-positive and tri-positive ions. When this occurs, it becomes necessary to recharge or regenerate the resin bed by flushing it with a regenerant, typically a solution of sodium chloride or potassium chloride. The concentration of uni- positive ions in the regenerant is sufficiently high to offset the unfavorable electrostatic competition and the binding sites are recovered by unipositive ions.

Regeneration of early types of water softeners was affected manually only after it was discovered that the treatment capacity of the resin bed has been exceeded and the water flowing there through is no longer "soft." In an effort to eliminate the need for manual regeneration, water softener control systems were provided with a mechanical clock which initiated water softener regeneration on a periodic basis. However, water usage typically varies so that regenerating a regular intervals may occur before it is actually required, thereby consuming more water and regenerate than is necessary, or regeneration may not occur soon enough resulting in hard water being fed throughout the building. As a result, demand type water softener controls have been developed which determine the remaining capacity of the resin bed to soften water. One type of such a demand type control system utilizes electrodes to measure the electrical conductivity of the resin bed and regeneration is initiated based on that measurement.

Regardless of the type of control system used to determine when to regenerate the resin bed, the control system activates a motor that operates a valve. The valve has several positions corresponding to the backwashing, brining, rinsing and brine replenishing steps of the regeneration process. The brining step draws the regenerant, typically a solution of a salt such as sodium chloride or potassium chloride, from a supply tank. At the end of the process, fresh water is set into the tank to produce a salt solution for the next regeneration procedure. It is important that the proper amount of salt solution be produced in the tank. To little solution will not effectively regenerate the resin bed, while to much will consume an excessive amount of salt during every regeneration cycle.

Heretofore, fresh water was added to the brine tank for a fixed period of time, as controlled by the speed of the motor which operated the water softener control valve. As a consequence, the actual amount of water that entered the brine tank varied depending upon the pressure of the water being supplied to the water softener. That pressure varies from installation to installation and from time to time at the same installation. Therefore, a given model of water softener replenished the salt solution to different amounts depending on the particular water pressure at that time.

SUMMARY OF THE INVENTION

A valve is provided to control flow of water through a passage that leads from a control valve assembly of a water treatment apparatus. For example, this valve may be a regenerant refill valve that controls the flow of water through a passage that leads from a control valve assembly to a brine tank of the water treatment apparatus. A valve seat is located between a first section and a second section of the passage. The valve seat has a first end with a concave surface facing the first section and an aperture extends between the concave surface and a second end that faces the second section. A groove is in the concave surface between the first end and the aperture. A deformable valve element is able to move within the first section of the passage toward and away from the valve seat.

Water flowing from the first section to the second section pushes the valve element against the concave surface. The water pressure causes the valve element to deform into the groove in the concave surface with the amount of deformation being a function of the magnitude of the water pressure. Therefore, greater the pressure the farther the valve element enters the groove and the smaller the size of the flow path through the valve. In other words, the size of that flow path is inversely related to the pressure magnitude, Varying the flow path size as a function of the water pressure results in a substantially constant fluid flow rate through the valve regardless of variation in the water pressure.

Maintaining a constant flow rate results in substantially the same amount of water being supplied into the brine tank regardless of variation in the water supply pressure. As a consequence, the desired quantity of regenerant solution is produced in the brine tank during each regeneration procedure of the water treatment apparatus, for example.

DESCRIPTION OF THE OF THE DRAWINGS

DETAILED DESCRIPTION OF THE INVENTION

Figure 1:
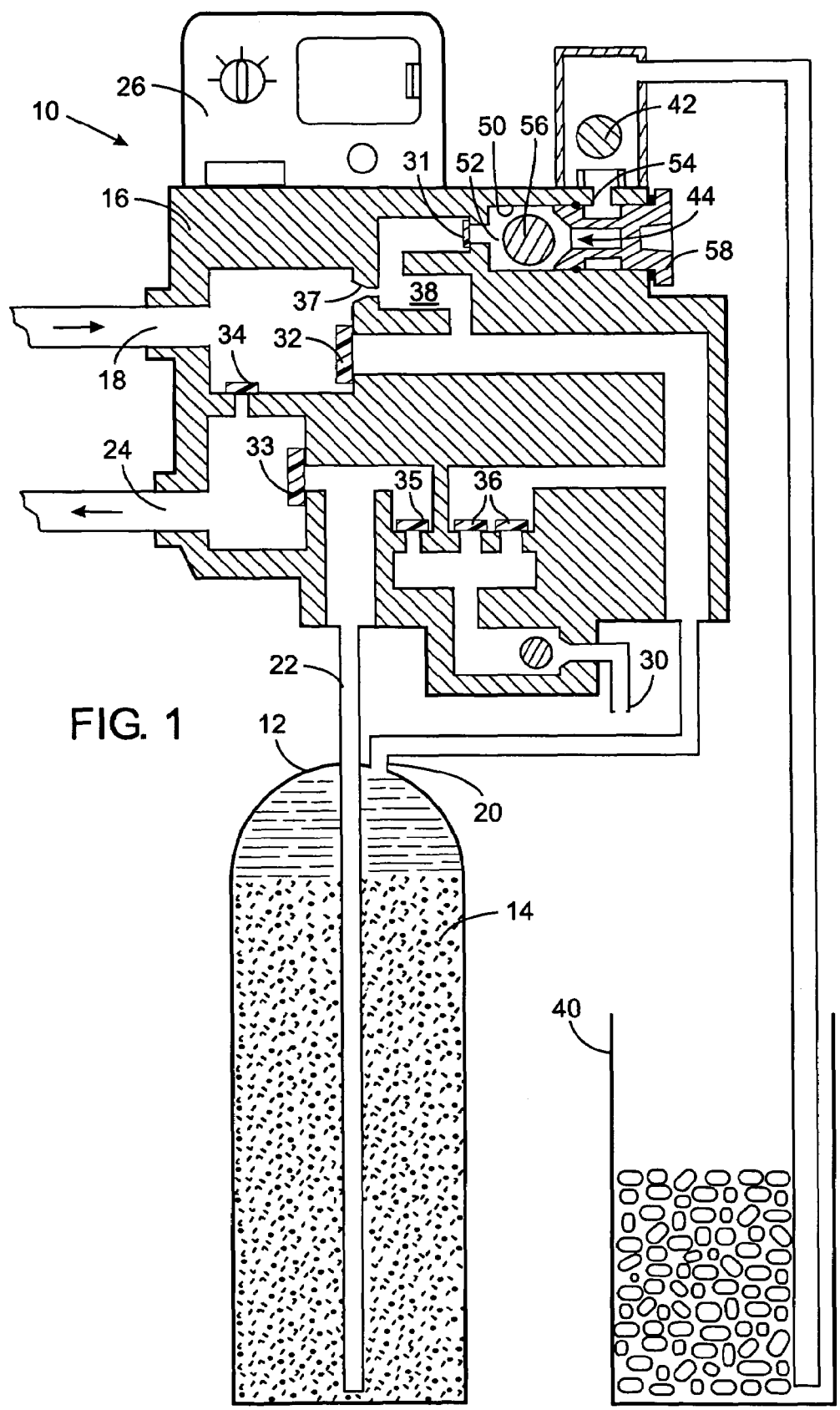
FIG. 1 is a diagram of a water softener that incorporates regenerant refill valve according to the present invention.

Referring initially to FIG. 1, a water softener 10 includes a treatment tank 12 which contains a bed 14 of conventional ion exchange resin particles. A control valve assembly 16 is connected to the top of the treatment tank 12. In the water treatment, or service, mode, hard water to be softened is supplied to an inlet port 18 from which water flows to an inlet 20 at the top of the treatment tank 12 and then flows through the resin bed to absorb minerals from the water. The water then flows into outlet conduit 22 at a point adjacent the bottom of the treatment tank 12 and back into the control valve assembly 16 from which the water exits via an outlet port 24.

The resin bed 14 eventually becomes exhausted and no longer is capable of softening the water. Either in response to a timer or in response to sensors detecting depletion of the resin bed, a controller 26 initiates a standard regeneration process. The controller 26 is fixed to the control valve assembly 16 and has a motor that is adapted to drive cam shaft which operates six flapper-type valves 31, 32, 33, 34, 35 and 36 within the control valve assembly 16. Specifically, a cam is associated with each valve and moves a flapper away from a surface of the valve assembly body to open a passage. The valves 31–36 are opened in several combinations to direct water through the different passage for the various stages of the regeneration process.

In the water treatment mode, the second and third valves 32 and 33 are opened and the remaining valves are held closed. This sends water from the inlet port 18 to the inlet 20 of the treatment tank 12. The treated water leaves the treatment tank 12 via outlet conduit 22 and flows through the control valve assembly 16 exiting from the outlet port 24.

A resin bed regeneration procedure commences with a backwash step in which hard water is directed from the inlet port 18 sequentially through opened fourth and third valves 34 and 33 into the outlet conduit 22 of the treatment tank 12. This reverse flow the exits the treatment tank 12 via inlet 20 and continues into the control valve assembly 16. The water then flows through an open pair of sixth valves 36 and exits via a drain outlet 30 from which it enters the sewer system of the building.

The backwash step is followed by a brining step in which the first, fourth and fifth control valves 31, 34 and 35 are opened, while the other valves are maintained closed. This configuration of the control valve assembly 16 directs water between the inlet and outlet ports 18 and 24 to supply water to the building while brining occurs. The hard water from the inlet port 18 also is directed through an orifice 37 into an injector passage 38 which creates a partial pressure that draws that salt solution from a brine tank 40 into that water flow which continues through the valve assembly into the inlet 20 of the treatment tank 12. The salt solution exits the treatment tank 12 via the outlet conduit 22 and flows through an opened fifth valve 35 to the drain outlet 30. This process introduces the brine from tank 40 into the resin bed 14, thereby displacing mineral ions previously collected in that bed.

When the salt solution has been completely withdrawn from the brine tank 40, an air check valve 42 closes, thereby preventing air from being drawn from that tank into the control valve assembly 16. Thereafter, a slow rinse then occurs as water continues to flow through the same paths of the control valve assembly as during the brining step.

The regeneration process culminates with a brine refill and purge step in which the first, second, third and fifth valves 31, 32, 33 and 35 are opened while the fourth and sixth valves 34 and 36 are closed. This configuration of the valve assembly 16 sends water in a first path from the inlet port 18 through the through opened second valve 32, first valve 31 and the air check valve 42 into the brine tank 40 to replenish the salt solution. Some of the water from the second valve 32 also flows the inlet 20 of the treatment tank 12 from which it exits via the outlet conduit 22. This flow continues through the open fifth valve 35, exiting the valve assembly via the drain outlet 30. During this step, the building is supplied with water that exits the treatment tank 12. At the completion of the brine refill and purge step, the valve assembly is restored to the water treatment mode by closing the valves with the exception of the second and third valves 32 and 34.

During the replenishing of the salt solution, the flow of fresh water through the valve assembly 16 to the brine tank 40 is controlled by a unique regenerant refill valve 44 which restrict that flow to a relatively constant rate regardless of the pressure at which that fresh water is supplied to the valve assembly 16. Therefore substantially the same quantity of water will be added to the tank under varying pressure conditions. This flow rate is determined based on the quantity of brine that is required to regenerate a fully depleted resin bed 14.

With continuing reference to FIG. 1, the regenerant refill valve 44 is located within a bore 50 of the valve assembly 16 which is part of the passage leading to the brine tank 40. The bore 50 has a chamber 52 at one end which is connected to the injector passage 38. An outlet 54 of the bore 50 opens into the air check valve 42. The regenerant refill valve 44 has a soft rubber, spherical valve element 56 that moves within the chamber 52 and which can engage a valve seat 58. Although, the valve element 56 is described as a soft rubber sphere, other shapes and resiliently deformable materials, such as a plastic, can be used. The valve seat 58 is shown in detail in FIG. 2 and comprises an annular seat body 60 with a conically concave surface 62 at its exposed surface which can be engaged by the valve element 56. Although a conical concave surface 62 is preferred for the valve seat 58, other concave shaped surfaces may be used. At the bottom of the concave surface 62 is an aperture 64 extending through the ring to the opposite side and opening into the bore outlet 54. With additional reference to FIG. 3, the concave surface 62 has a groove 66 extending along the concave surface from the outer periphery of the seat body 60 to the aperture 64. Although the present embodiment of the regenerant refill valve 44 has a groove with a generally V-shaped cross section, other shapes which narrow going deeper into the groove can be employed. At will be described, upon engaging the concave surface 62, valve element 56 is pushed into the groove 66 by an amount the depends on the magnitude of the water pressure. Therefore, the flow path through the regenerant refill valve 44 has a size which varies inversely to variation of the water pressure. The flow path also may be provided by a plurality of grooves.

The contour of the groove 66 and the deformation characteristics of the valve element 56 can be varied to achieve the desired relationship between fluid pressure and flow. The shape and length of the groove 66 is determined based on hydraulic flow factors, such as flow characteristics at the entrance to the groove and eddy currents at the groove outlet which are empirically determined.

Figure 2:
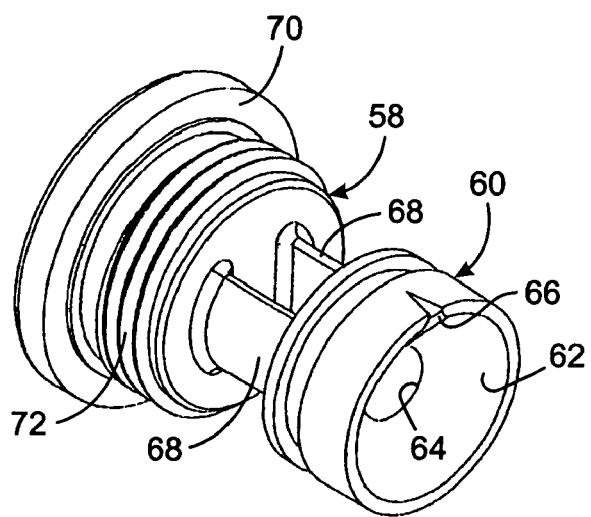
FIG. 2 is a isometric view of the components of the regenerant refill valve removed from the control valve assembly.
Figure 3:
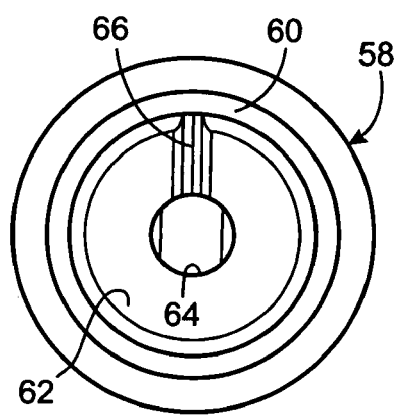
FIG. 3 illustrates a conically concave surface of the regenerant refill valve.

Referring again to FIG. 2, a pair of elongated spacers 68 project from the end of the seat body 60 which is remote from the concave surface 62. The spacers 68 are attached to the interior surface of a plug 70 to provide a gap between the plug and the seat body 60. The plug has a threaded surface 72 which engages an aperture 74 in the valve assembly 16 as shown in FIG. 2, to secure the seat 58 in that assembly.

During the brine refill and purge stage of the regeneration procedure, water flows into the regenerant refill valve 44 through the inlet chamber 52 and exits the via the bore outlet 54. The force of the flow pushes the valve element 56 against the concave surface 62 of the valve seat 58. Upon initial engagement, the spherical shape of the valve element 56 abuts the conical concave surface 62 in a substantially circular line with the exception of a gap at the groove 66. At that time, the fluid flow path through the regenerant refill valve 44 is limited to that groove 66. Under increased water pressure, the valve element 56 deforms against the valve seat 58 being pushed into the V-shaped groove 66 to further reduce the size of the fluid flow path. Thus, the greater the pressure of the water entering the control valve assembly 16, the more spherical valve element 56 is deformed into the V-shaped groove 66 and the smaller the resultant passage becomes between the valve element and the surface of the concave surface 62 in the seat body 60. Thus, the size of that passage is inversely related to the water supply pressure, i.e. the greater the pressure, the smaller the passage. The taper of the walls of the groove is designed to produce a constant flow rate through the regenerant refill valve under varying water pressure conditions.

This operation of the regenerant refill valve 44 controls the rate of fluid flow through the valve, maintaining a substantially constant flow rate. Because the brine refill and purge stage of the regeneration process occurs for a fixed time interval determined by the controller 26, the constant flow rate for the fixed amount of time results in a substantially identical volumes of water being introduced into the brine tank 40 regardless of the pressure of the water at the water softener inlet port 18. As a consequence, a relatively fixed amount of brine solution is produced in the tank following each regeneration procedure.

The foregoing description was primarily directed to preferred embodiments of the invention. Although some attention was given to various alternatives within the scope of the invention, it is anticipated that one skilled in the art will likely realize additional alternatives that are now apparent from disclosure of embodiments of the invention. Although the present invention has been described in the context of a regenerant refill valve, the novel concepts can be applied to different valves used in other flow paths within a water softener control valve assembly, such as valves the control backwash, purge and drain flows. Accordingly, the scope of the invention should be determined from the following claims and not limited by the above disclosure.

What is claimed is:

1. A flow control valve for a passage having a first section and a second section through which water flows in a water treatment apparatus, the flow control valve comprising:
a valve seat within the passage between the first section and the second section and having an aperture there through that has a concave surface facing the first section of the passage and a groove in the concave surface; and
a deformable valve element moveably received within the first section of the passage;
wherein water flowing from the first section into the second section forces the valve element against the concave surface, and pressure of that water causes the valve element to be pushed into the groove thereby reducing a size of a flow path there through by an amount that that is related to a magnitude of that pressure.

2. The flow control valve as recited in claim 1 wherein reducing a size of the flow path in response to pressure of the water results in a substantially constant fluid flow rate occurring through the flow control valve regardless of variation of that pressure.

3. The flow control valve as recited in claim 1 wherein the concave surface is conical.

4. The flow control valve as recited in claim 1 wherein the valve element has a spherical shape.

5. The flow control valve as recited in claim 1 wherein the valve element is made of rubber.

6. The flow control valve as recited in claim 1 wherein the groove narrows going deeper therein.

7. The flow control valve as recited in claim 1 wherein the groove has a V-shaped cross section.

8. The flow control valve as recited in claim 1 wherein the valve seat comprises a seat body with a first end from which the concave surface extends inwardly toward an opposing second end of the seat body; the aperture extends from the concave surface to the second end; and the groove extends from the first end to the aperture.

9. The flow control valve as recited in claim 8 wherein the valve seat further comprises a plug engaging a wall of the passage; and a first spacer extending between the plug and the seat body thereby defining at least a portion of the second section of the passage there between.

10. The flow control valve as recited in claim 1 wherein the valve element moves away from the concave surface of the valve seat in response to fluid flow from the second section to the first section.

11. A flow control valve for controlling flow of fluid through a passage to a brine tank of a water treatment apparatus, the flow control valve comprising:
a valve seat defining a first section and a second section in the passage, and having a first end with a concave surface facing the first section and an aperture extending from the concave surface to a second end that faces the second section, the valve seat including a groove in the concave surface; and
a valve element moveably received within the first section of the passage, wherein water flowing from the first section toward the second section forces the valve element against the concave surface, and pressure of that water causes the valve element to be pushed into the groove thereby reducing a size of a flow path there through so that a substantially constant fluid flow rate through the flow control valve occurs regardless of variation of that pressure.

12. The flow control valve as recited in claim 11 wherein the concave surface is conical.

13. The flow control valve as recited in claim 11 wherein the valve element has a spherical shape.

14. The flow control valve as recited in claim 11 wherein the valve element is made of rubber.

15. The flow control valve as recited in claim 11 wherein the groove narrows going deeper therein.

16. The flow control valve as recited in claim 11 wherein the valve seat comprises a seat body with a first end from which the concave surface extends inwardly toward an opposing second end of the seat body, wherein the aperture extends from the concave surface to the second end and the groove extends from the first end to the aperture.

17. The flow control valve as recited in claim 16 wherein the valve seat further comprises a plug engaging a wall of the passage; and a first spacer extending between the plug and the seat body thereby defining at least a portion of the second section of the passage there between.

18. The flow control valve as recited in claim 16 wherein the valve seat further comprises:
   a plug engaging a wall of the passage and spaced from the seat body thereby defining at least a portion of the second section of the passage there between; and
   first and second spacers extending between the plug and the seat body on opposite lateral sides of the aperture.

19. The flow control valve as recited in claim 11 wherein pushing the valve element into the groove reduces a size of a fluid path through the groove by an amount that is directly related to pressure of the water.

20. The flow control valve as recited in claim 11 wherein the valve element moves away from the concave surface of the valve seat in response to pressure in the first section being less than pressure in the second section, thereby allowing fluid flow from the second section to the first section.

* * * * *